UNITED STATES PATENT OFFICE.

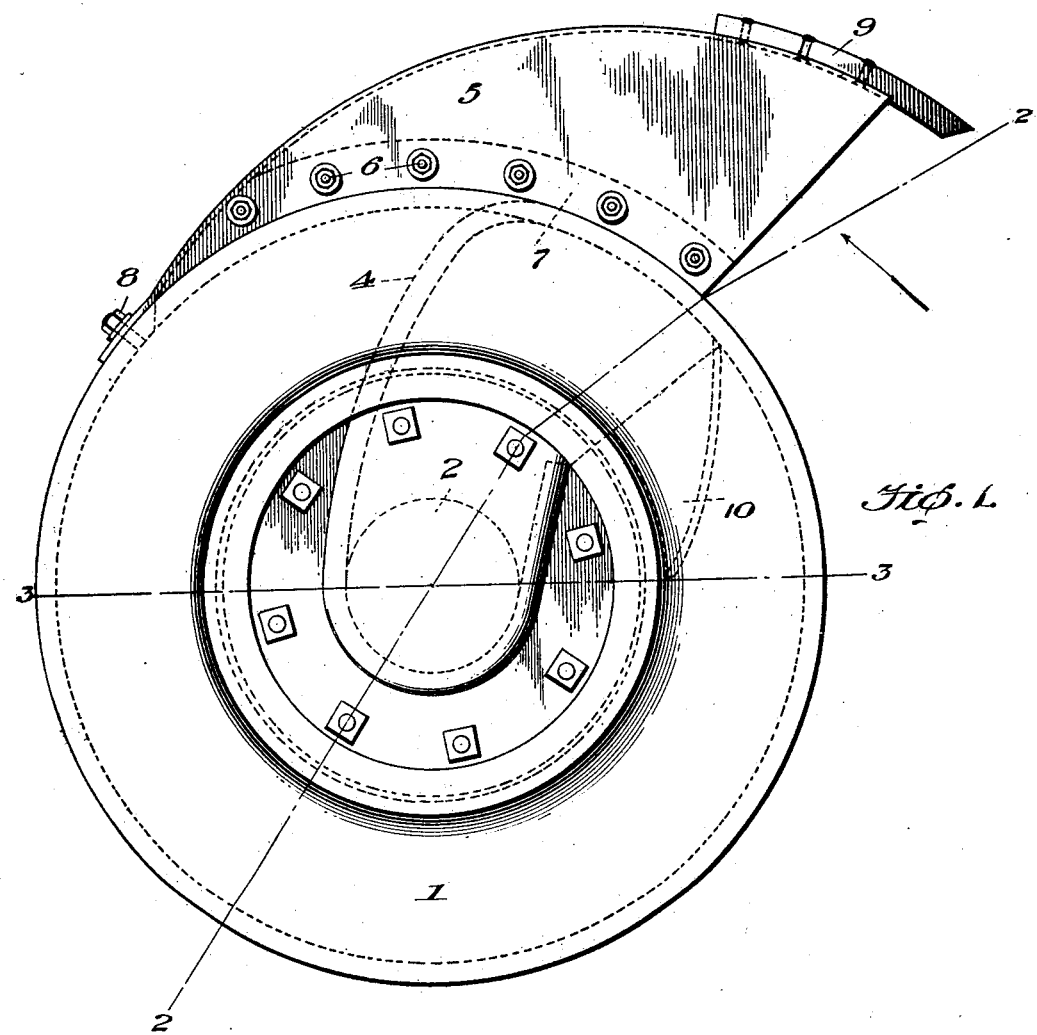

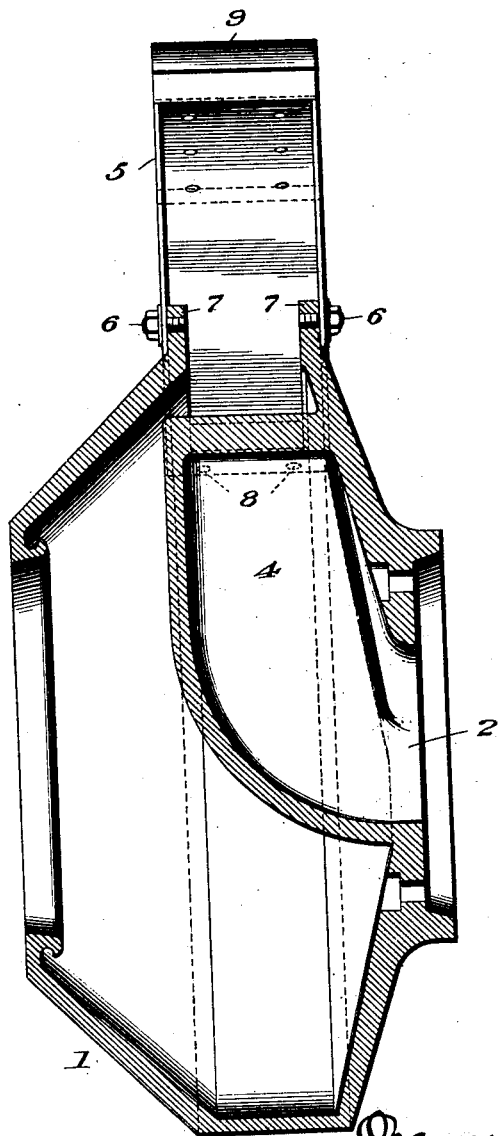

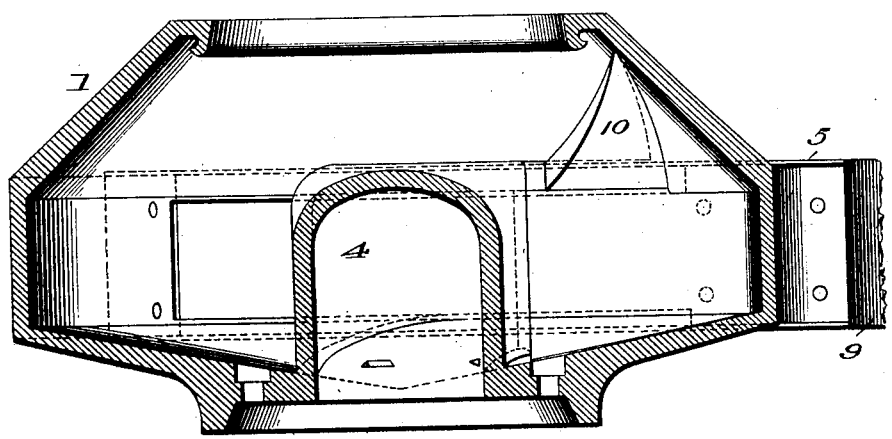
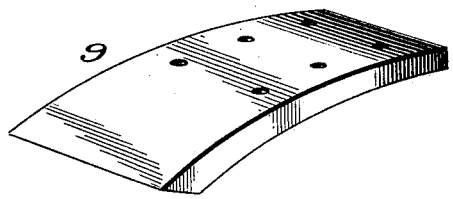

OSCAR H. JOHNSON AND HENRY F. WEBB, OF DENVER, COLORADO, ASSIGNORS TO THE MINE & SMELTER SUPPLY COMPANY, OF DENVER, COLORADO.

FEEDER.

1,399,124.  Specification of Letters Patent.  Patented Dec. 6, 1921.

Application filed December 5, 1917. Serial No. 205,531.

*To all whom it may concern:*

Be it known that we, OSCAR H. JOHNSON and HENRY F. WEBB, citizens of the United States of America, residing at Denver, in the county of Denver and State of Colorado, have invented certain new and useful Improvements in Feeders, of which the following is a specification.

Our invention relates to an improvement in feeders of the spiral type and the present invention possesses certain advantages over other inventions of this type which make for greater capacity, economy and efficiency.

Our invention consists in a rotary drum of the spiral feed type having a detachable scoop at the periphery.

In the accompanying drawings Figure 1, is a view in end elevation.

Fig. 2, is a vertical section on the line 2—2 of Fig. 1.

Fig. 3, is a horizontal section on the line 3—3 of Fig. 1, and Fig. 4 is a perspective view of the detachable claw or tooth.

The numeral 1, represents the drum feeder with the usual feed opening 2, in one end and having the inside scoop 4, shown in dotted lines in Fig. 1, and back of which is the peripheral opening 3 leading directly into the drum.

The numeral 5, indicates the scoop which is detachably secured to the outer rims 7, of the drum at the sides by screws or similar means 6, and at the inner end by screws 8, as clearly indicated in Figs. 1 and 2.

This scoop 5, has a general curve preferably of much greater radius than that of the periphery of the drum as shown in Fig. 1, and is so attached that its smaller or more constricted end is located over the opening back of the inside scoop 4, shown in Fig. 1, which provision is made to insure scooping and holding a maximum amount of ore caught by the scoop, a large portion of which might otherwise be spilled or dropped.

The claw or tooth 9, is riveted or otherwise secured to the outer and larger end of the scoop. This, like the scoop itself, is capable of being detached and renewed at any time, thus greatly prolonging the life of the feeder and increasing its efficiency.

A feeder of this construction with this detachable spout is a radical improvement over the modern type of spiral feeder now commonly in use. By reason of this scoop 5, being detachable there are three important advantages, first, the radius can be changed to suit installation conditions; second, when the scoop wears out, it can be replaced without the necessity of renewing the entire drum; third, a feeder of this type overcomes and obviates the foundry strains and stresses in the construction of a feeder drum of one integral formation.

In many of the feeders now in use there is a serious defect, due to the fact that much of the coarse material spills out, down through the scoop, thus causing excessive wear on the scoop, not to speak of danger of breaking it off and wrecking the feeder boxes, whereas our present feeder has the end opening 12 located back of the internal scoop 4, leading from the scoop directly behind said internal spiral so that the scoop acts as a protector to this opening and in consequence very little, if any, coarse material falls out.

Again, in the present type of spiral drum feeder, the internal spiral occupies practically 90 degrees of the drum area. This causes a long, narrow passage for the material to work through before it can get into the inside scoop. In our feeder this scoop is very much less in size, occupying not more than 45 to 50 degrees of surface, thus making the passage shorter and consequently offering less danger of choking with the ore in this passage, also from the cutting edge of this scoop we propose to have a wing 10, which is flared out toward the receiving end opening of the drum, and arranged in a manner so that it collects all of the material in the drum, guiding and working it into the interior scoop. In other types of feeders this cover wall is in line with the interior spiral, so that it only cuts a path the width of the spiral, thereby leaving much material in the bottom of the drum, which it is unable to pick up, but which is obviated by the use of this wing 10.

Our present invention possesses these and other advantages which greatly enhance its durability, efficiency and capacity.

We claim:

1. A drum feeder the major portion of which is in a single casting, having openings at opposite ends and one in the periphery and provided with an integral, internal scoop and also provided internally with a wing which is flared out toward the receiving end opening of the drum and so arranged that it collects all of the material in the drum guiding and working it into the inside scoop and an external scoop detachably secured over the peripheral opening.

2. A drum feeder having an internal scoop and an opening in one end and also in its periphery back of said internal scoop and a scoop secured at the rim of the drum over said peripheral opening, the end over the opening being gradually reduced in size and means at the inner end and the sides of said scoop for detachably securing it to to the drum.

3. A drum feeder having an inside scoop and provided with an end or discharge opening and having a wing which is flared out toward the said end opening of the feeder.

4. A drum feeder having an inside scoop and provided with an end or discharge opening, and having a wing which is flared toward the end opening of the inside scoop for the purpose of diverting and guiding the material into the same.

In testimony whereof we affix our signatures.

OSCAR H. JOHNSON.
HENRY F. WEBB.